United States Patent
Calkins

[15] 3,651,870
[45] Mar. 28, 1972

[54] ROD WEEDER

[72] Inventor: Oscar C. Calkins, Spokane, Wash.

[73] Assignee: Calkins Manufacturing Company, Spokane, Wash.

[22] Filed: Apr. 18, 1969

[21] Appl. No.: 817,408

[52] U.S. Cl............................172/44, 172/311, 172/501, 172/662
[51] Int. Cl..............A01b 39/19, A01b 49/00, A01b 63/00
[58] Field of Search..............172/44, 462, 469, 500, 501, 172/400, 401, 311, 662, 265, 498, 314

[56] References Cited

UNITED STATES PATENTS

| | | | |
|---|---|---|---|
| 3,033,294 | 5/1962 | Edwards | 172/677 X |
| 3,515,219 | 6/1970 | Jackson et al. | 172/44 |
| 2,165,019 | 7/1939 | Van Patten | 172/44 |
| 2,599,251 | 6/1952 | Garrett | 172/662 X |
| 2,900,031 | 8/1959 | Sorensen et al. | 172/44 |
| 3,021,908 | 2/1962 | Dlugosch | 172/501 X |
| 3,057,414 | 10/1962 | Ralston | 172/501 X |
| 3,140,678 | 7/1964 | Morris | 172/44 X |
| 3,194,321 | 7/1965 | Sande | 172/44 |
| 3,302,728 | 2/1967 | Sullivan et al. | 172/265 |
| 3,360,053 | 12/1967 | Doepker | 172/44 |
| 3,367,678 | 2/1968 | Tonne | 172/311 X |
| 3,502,154 | 3/1970 | Rogers | 172/311 |

*Primary Examiner*—Robert E. Pulfrey
*Assistant Examiner*—Stephen C. Pellegrino
*Attorney*—Wells & St. John

[57] ABSTRACT

A rod weeder utilizing a floating frame by which the weeder rod is permitted to freely move about a transverse pivot on a rigid framework or hitch. In one embodiment, elevational control is provided for raising or lowering the pivotal axis of the weeder rod frame relative to the ground to vary the inclination of the operative line of draft. In a second embodiment, provision is made for selective elevation of the towing framework relative to the ground with little or no modification of the line of draft for the weeder rod. Where desired, a yieldable connection is described for the rod supports to permit yielding of the subsoil rod when required by obstacles.

13 Claims, 14 Drawing Figures

INVENTOR.
OSCAR C. CALKINS
BY Wells & St. John
ATTYS.

PATENTED MAR 28 1972
3,651,870
SHEET 9 OF 9
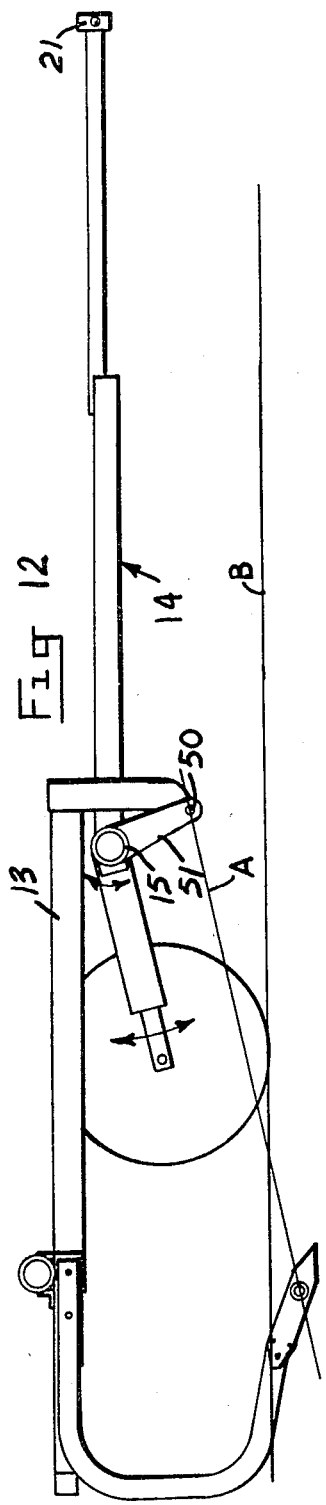
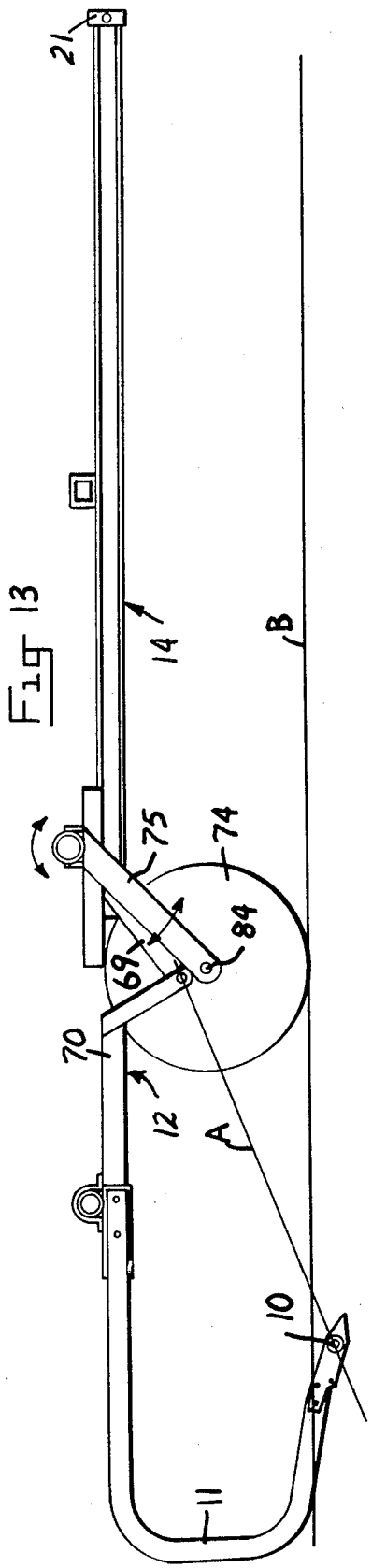
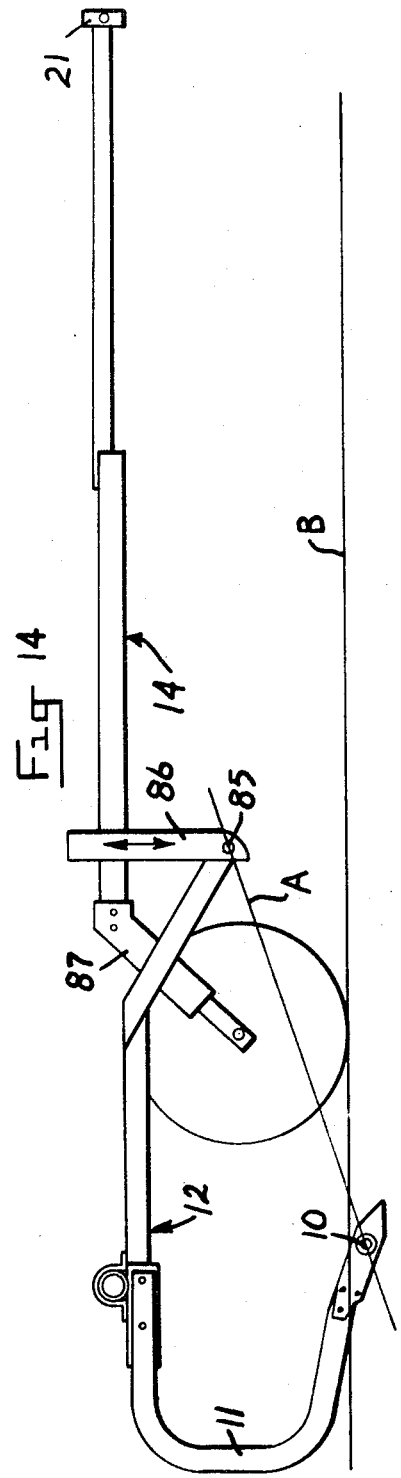
INVENTOR.
Oscar C. Calkins
BY Wells & St. John
Attys.

ROD WEEDER

BACKGROUND OF THE INVENTION

Two types of prior rod weeder devices which are pertinent to an understanding of the present improvement are disclosed in U.S. Pat. No. 2,862,433 to Guyer and U.S. Pat. No. 3,288,480 to Calkins. In the first of these, there is shown a rod weeder supported on a towing framework and vertically adjustable between front and rear supporting wheels by means of a positive mechanical linkage. In such a structure, the rod and rod supports cannot move upwardly without lifting the entire weight of the frame, including the ground-engaging drive wheels which turn the rod. Such implements have been pulled by a flexible towing hitch in the form of a cable or chain and are not readily adaptable to highway travel or other transport between field locations. While multiple units of this type implement have been used, since each unit is flexibly connected to the towing vehicle by cables or the like, they must be handled independent of one another for transport.

U.S. Pat. No. 3,288,480 discloses one attempt to provide a "unitized" rod weeder. By the designation "unitized" is meant a rod weeder supported on a framework in such a fashion that a plurality of rod sections can be handled as an integral unit for field and transport purposes. In the case of U.S. Pat. No. 3,288,480, this was accomplished by utilizing a rigid framework which was hinged between adjacent sections about axes parallel to the direction of field travel. A rigid tongue connection to the towing tractor was provided for field use, and vertically adjustable supporting wheels were utilized to elevationally locate the weeder rods. However, the weeder rods were fixed to the towing frame, and the frame had to be lifted by the rod in order to clear any obstructions encountered by the rod. Lifting of the frame also lifted the driving wheels for the rod and rotation of the rod was then discontinued.

The present disclosure is concerned with an apparatus designed to incorporate the best features of the type of implement shown in U.S. Pat. No. 2,862,433 and the type of implement shown in U.S. Pat. No. 3,288,480, while providing additional advantages not available with either. While the plurality of rod units shown herein are independent of one another so as to independently adjust to ground conditions, they are at the same time "unitized" on a common frame and subjected to common control elements. These elements control the pressure applied to the rod to maintain it in a subsoil position, the elevation of the rod for transport purposes, and the configuration of the supporting apparatus for field or transport conditions.

SUMMARY OF THE INVENTION

The invention disclosed herein, shown in the form of two embodiments and described with respect to other modifications, is an improvement in a rod weeder of the type having a transverse powered weeder rod that moves through the field at a subsoil elevation. The rod is rotatably journaled by a plurality of upright rod supports. A rigid towing framework is provided with a vehicle hitch at its forward end by which it can be pivotally connected to a towing vehicle about a transverse axis. The improvement comprises a rod weeder frame having the rod supports mounted thereto, the rod weeder frame being pivotally mounted to the towing framework about a transverse axis positioned between the rod and the hitch. Limited pivotal movement of the rod weeder frame is permitted about its axis on the towing framework during field operation.

The invention further relates to a novel manner in which such rod weeder units are mounted in a manner permitting control of several units on a single assembly. There also is provided optional means by which the individual rod supports are permitted to yield upwardly due to forces exerted thereon by obstacles encountered by the moving rod. Furthermore, provision is made for transport of the apparatus as a unit.

It is a first object of this invention to provide a practical support for a rod weeder wherein the rod is permitted to "float" at a subsoil elevation related directly to soil conditions encountered thereby, such as degree of compaction, moisture content, etc.

Another object of this invention is to provide a mounting for a weeder rod wherein the operator can remotely control the downward pressure exerted on the rod to hold it in a subsoil elevation. This pressure can be varied during operation in order to match soil conditions. The pressure is provided on the rod without subjecting the rod to the entire weight of the supporting framework necessary for field and transport purposes.

Another object of this invention is to provide a practical unitized framework for guiding and supporting multiple rod units in the field and during transport. When desirable, the weeder rod can also be combined with cultivator implements which can be independently adjusted in a vertical direction to meet field requirements.

These and further objects will be evident from the following disclosure, taken together with the accompanying drawings.

BRIEF DESCRIPTION OF THE DRAWINGS

FIGS. 12, 13 and 14 are schematic elevation views illustrating the essential physical relationship of the elements of the apparatus.

DESCRIPTION OF THE PREFERRED EMBODIMENTS

Figure 1:
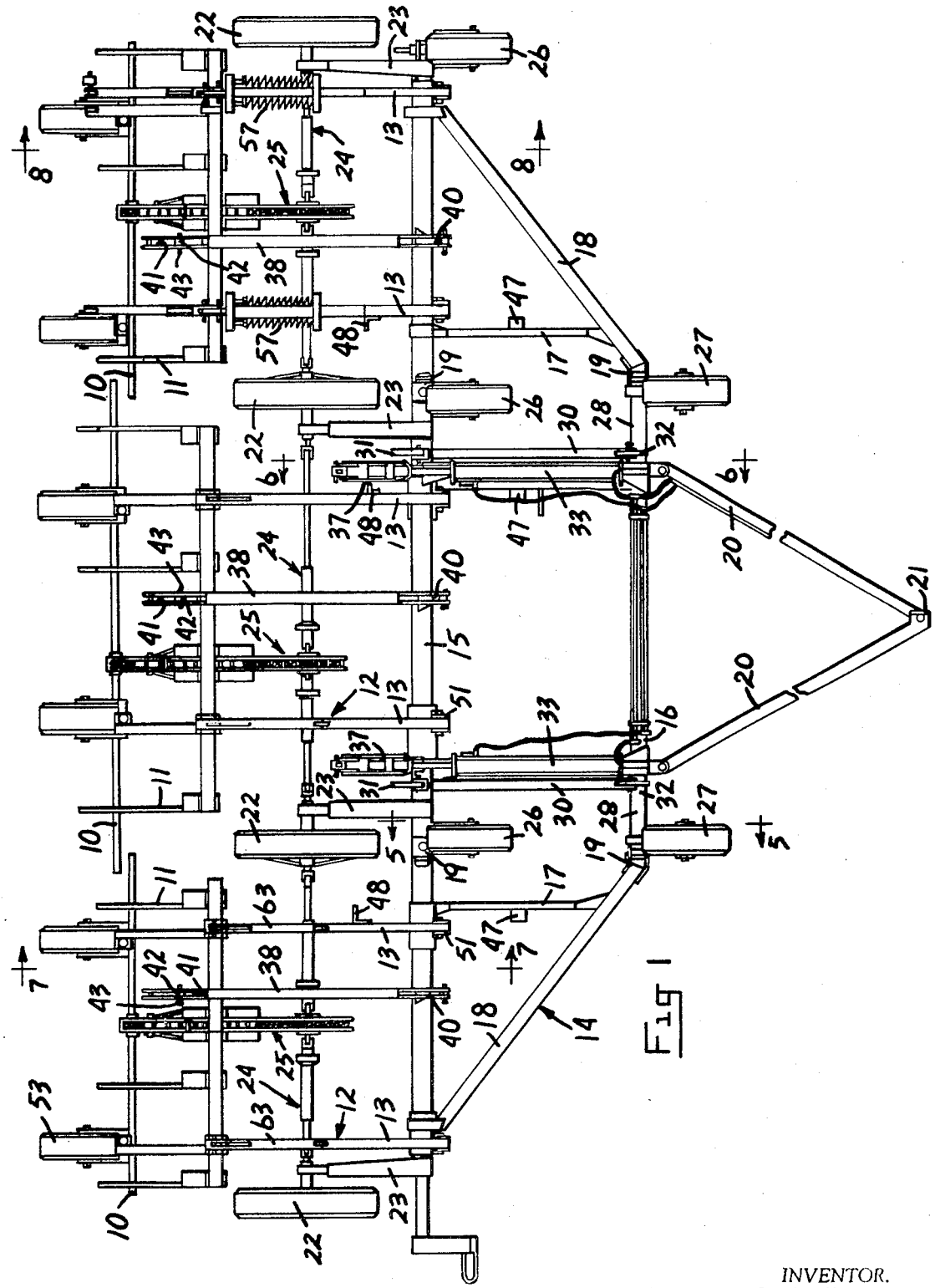
FIG. 1 is a top view of a first embodiment of the invention with a portion of the hitch broken away.

The drawings submitted with this specification illustrate in detail two forms of the apparatus, with additional variations being suggested by schematic illustration and description. Each form includes several common elements. The first is a transverse rotating rod 10 of the type shown in the above mentioned U.S. Pat. Nos. 2,862,433 and 3,288,480. The rod is supported by gooseneck supports 11 and driving boots 25 which rotatably journal rod 10 at their lower ends. The supports 11 in turn are mounted on a rod weeder frame 12 which is pivotally supported with respect to a rigid towing framework 14 for free movement about a transverse axis. The weight of the heavy towing framework 14 is therefore not directed onto the rod 10 itself. The required pressure necessary to maintain rod 10 in the ground is provided by proper location of the pivotal axis of the rod weeder frame relative to the line of draft that exists between the rod and the hitch frame relative to the line of draft that exists between the rod and the hitch attachment to a towing vehicle. By providing vertical adjustment of this pivotal axis relative to the line of draft, one can selectively vary the pressure on the rod. Since rod 10 is supported on a "floating" frame, it is free to move upwardly to overcome obstacles and to move downwardly in response to varying soil compactness and moisture content.

To understand the nature of the present improvements, one must understand the purpose of a rod weeder and the manner in which it is used in modern farming practices. The movement of a subsoil rod through a field, without rotation of the rod simply cuts the roots of the weeds. By rotating the rod about its transverse axis during such movement, trash is worked off the rod as it traverses the field. The principal purpose of using a rod weeder under current practice is not simply to eliminate weeds. The rotating rod is used to compact the soil at the moisture line, leaving a broken insulating mulch of soil clods above the moisture line.

It is common practice to use a rod weeder during summer fallow in the field that is free of weeds. The compacting of a subsoil layer lowers the moisture line in the field and slows the loss of moisture following a subsequent rain. In addition, soil compacted to the surface is more likely to germinate seeds and produce weeds, while the seeds cannot germinate in the dry upper mulch left after passage of a rod weeder. The field is also better prepared for seeding of crops, which typically is accomplished at or below the moisture line left after proper conditioning of the field by use of a rod weeder.

The compacting of soil as a primary purpose of the rod weeder has led to a desire on the part of users to have a rod weeder of maximum width and capable of compacting to a varying depth across this width. This can be accomplished by connecting a series of independent weeder frames such as the unit shown in U.S. Pat. No. 2,862,433, using a flexible hitch or cable attached to each unit to hold them in side by side positions. Each unit is then free to operate at the depth required by the soil encountered thereby. However, being flexibly connected, the units cannot be operated in a reverse direction and are not readily conditioned for transport except by loading them upon a truck or other vehicle.

The present apparatus essentially combines the independent rod weeding operations of several units across a wide implement combination with unitary controls and a rigid towing framework designed for both field and transport use. In addition, the weight of the hitch frame is removed from the rod and the rod is free to move vertically during field use independent of the driving wheels that turn the rod. Thus, the rod need not overcome the dead weight of the hitch and driving wheels in order to ride over an obstruction. In addition, rotation of the rod is insured at all times because the driving wheels will not be lifted from the ground by upward movement of the rod.

FIRST EMBODIMENT

The first embodiment of the present invention is illustrated in FIGS. 1 through 9 and schematically in FIG. 12. The illustrated apparatus includes three adjacent rod weeder units. This is presented by way of example only. Each unit is typically 10 or 12 feet wide and can be used alone or in combination with a number of adjacent units up to the ability of the tractor or other vehicle to pull the combined implement through the field. Many actual field installations involve five units of 12 feet width for a total combined width of 60 feet.

Each rod weeder unit at the rear of the apparatus includes a transverse rod 10. The rods are rotatably journaled at the lower ends of conventional gooseneck supports 11, which provide rigid upright members to locate the rod 10 at a subsurface elevation during field operation. In the illustrated example there are three gooseneck supports 11 carrying each rod 10. The supports 11 in the central rod weeder unit are slightly offset from the rods 11 of the two side units. The ends of the respective rods 10 overlap one another to insure complete traversing of the field.

The gooseneck supports 11 are mounted to a rigid rod weeder frame 12 which includes longitudinal members 13 at each respective side of the rod weeder unit.

Forward of the rod weeder frames 12 is a towing framework 14. It comprises a number of transversely positioned sections equal in number to the number of rod weeder units. The main element of framework 14 is a transverse shaft 15 comprising a number of hinged segments equal in number to the number of framework sections. The segments of shaft 15 are aligned in end to end relation in a direction transverse to the movement of framework 14 during field operation. Each segment of shaft 15 is rotatably carried by a section of framework 14 for pivotal movement relative to its respective transverse central axis.

Framework 14 also includes a forward transverse member 16, a number of transversely spaced longitudinal braces 17 and outwardly flaring diagonal members 18. Braces 17 and members 18 rotatably support the respective segments of shaft 15.

At the forward end of towing framework 14 are a pair of folding extension arms 20 which converge forwardly in a triangular configuration during field operation (FIG. 1) and which are capable of being folded back against the front transverse member 16 during transport. While the elements of framework 14 as illustrated are designed for a three unit combination, obviously a greater number of units can be provided by adding additional central framework sections and building upon the forward triangular hitch connections so as to permit pulling of all of the units as an integral implement. The folding of the extensions 20 and the general type of framework modification needed for differing widths of weeder combinations are illustrated in prior U.S. Pat. No. 3,288,480.

The sections of framework 14 are hinged to one another so as to permit angular movement between adjacent sections about parallel longitudinal axis between the sections. This movement is permitted by universal joints 19 which connect the aligned ends of the segments of shaft 15 and by aligned universal joints 19 at the respective ends of the front transverse member 16. The pivotal axes of these universal joints 19 are aligned longitudinally, that is, they are aligned in directions parallel to the intended direction of movement of the apparatus during field operation.

The rods 10 are rotated by means of transversely spaced drive wheels 22 supported on the towing framework by means of wheel supports 23. Each wheel support 23 is identical and is fixed in an identical angular orientation to one segment of shaft 15. The drive wheels 22 are normally cleated and rotate rods 10 through universal drive connections 24 having provision for telescoping length adjustment and conventional drive boots 25. The details of the drive boots 25 and the drive connections from wheels 22 as shown herein are essentially similar to such details shown in prior U.S. Pat. No. 3,288,480.

Figure 5:
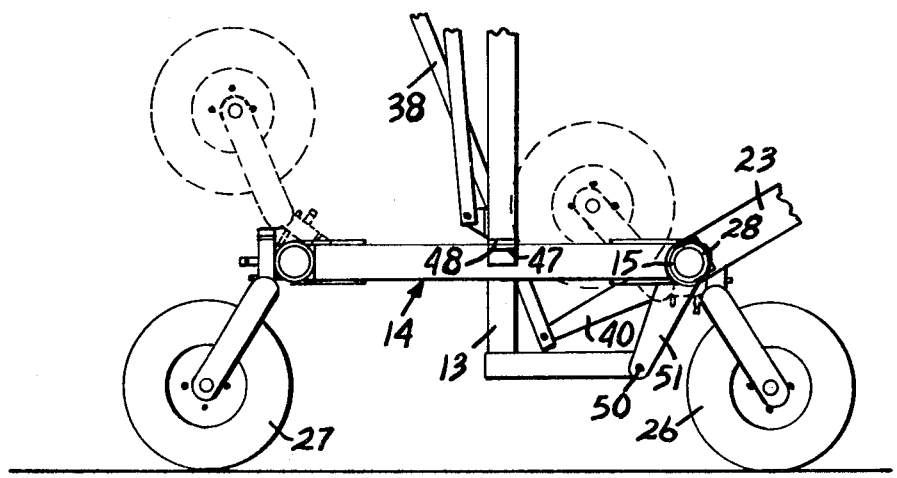
FIG. 5 is an enlarged fragmentary view taken along line 5—5 in FIG. 1 showing the transport wheels in alternate positions.
Figure 6:
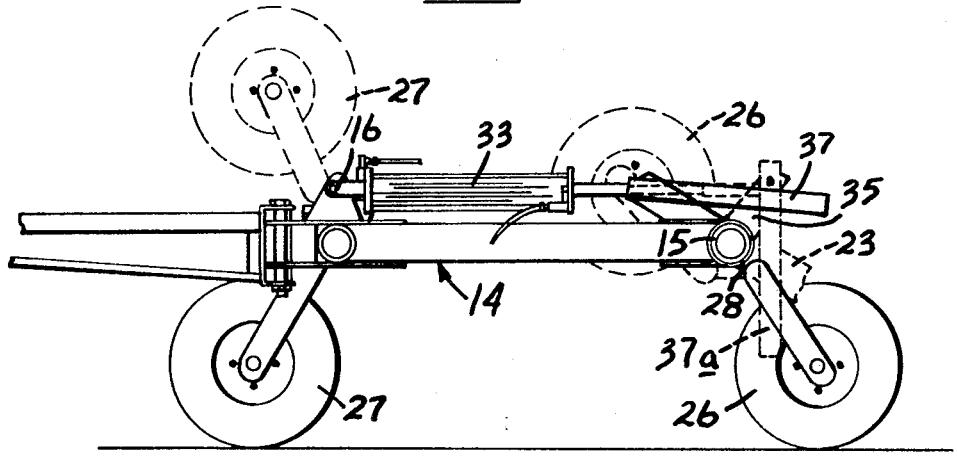
FIG. 6 is an enlarged sectional view taken along line 6—6 in FIG. 1, also showing the transport wheels in alternate positions.

Also mounted on the towing framework 14 are a plurality of transport wheels 26 and 27. The rear transport wheels 26 are carried by swivel supports fixed to the segments of shafts 15 in identical angular positions. The front transport wheels 27 are similarly carried by swivel supports fixed to collars 28 rotatably journaled on the front transverse member 16. The collar 28 are operatively controlled by the center segment of shaft 15 by means of connecting longitudinal links 30 pivoted at their respective ends to crank arms 31 and 32 which are fixed to and extend upwardly from shaft 15 and the respective collars 28. The connecting links 30 and crank arms 31, 32 form a parallelogram linkage by which the angular positions of collars 28 about the central transverse axis of member 16 correspond directly to the angular position of shaft 15 about its transverse central axis. The mounting of the transport wheels and manner of movement thereof are best seen in FIGS. 5 and 6.

The angular position of the segments of shaft 15 relative to the framework 14 is controlled by a pair of hydraulic cylinders 13 pivotally anchored at their forward ends at 16. The outer ends of the piston rods of the elongated cylinders 33 are connected pivotally to the upper ends of protruding crank arms 35 fixed to the shaft 15 (FIG. 6). Each cylinder 33 is also provided with a limit bar 37 pivoted coaxially on crank arm 35 along with the outer end of the piston rod. Each limit bar 37 is adapted to rest upon the outer end of the piston rod as shown in FIG. 1 to selectively limit the amount of movement of the apparatus during field operation. During conditioning of the apparatus for transport condition, the limit bars 37 are swung about their pivotal mount and hang freely (as shown at 37a in FIG. 6), thereby permitting full retraction and extension of the piston rods included in the assembly of the cylinders 33.

Figure 7:
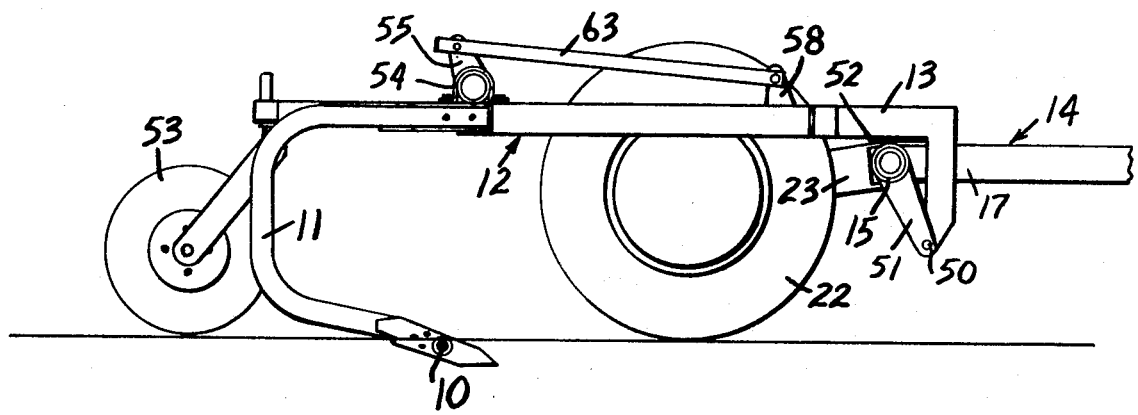
FIG. 7 is an enlarged fragmentary sectional view of the rod weeder frame as seen along line 7—7 in FIG. 1.
Figure 8:
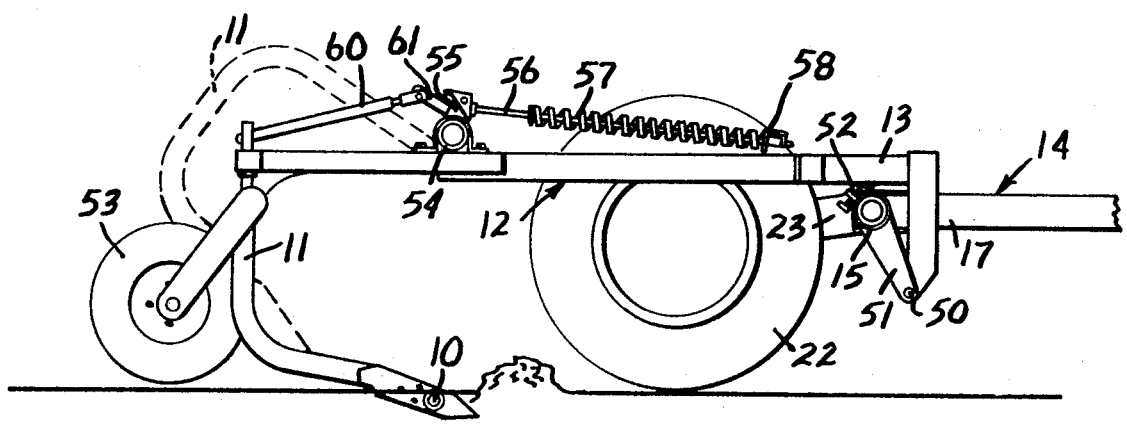
FIG. 8 is an enlarged fragmentary sectional view of the rod weeder frame as seen along 8—8 in FIG. 1.

As shown best in FIGS. 7 and 8, the rod weeder frames 12 are freely supported during field operation in a "floating" condition whereby the individual rod 10 carried by each rod weeder frame 12 can rise or fall vertically in response to the various forces to which it is subjected. As shown, the forward end of each longitudinal member 13 in each rod weeder frame 12 is pivotally connected at 50 to a downwardly extending projection 51. Each projection 51 is fixed to one of the longitudinal braces 17 of the towing framework 14 which encircles the shaft 15. The projections 51 do not rotate about the center of shaft 15, but are fixed part of one of the rigid towing framework sections 14. Adjustable stops 52 are fixed to the collars that mount each projection 51 (FIGS. 7, 8). Stops 52 are located under each longitudinal member 13. When soft soil is encountered, shaft 15 can be rotated by the operator, moving stop 52 upwardly as the wheels 22 are lowered, to thereby engage the longitudinal members 13. Rod 10 is thereby prevented from moving further in a downward direction and can be physically raised by additional extension of the hydraulic cylinder assembly 33.

Figure 4:
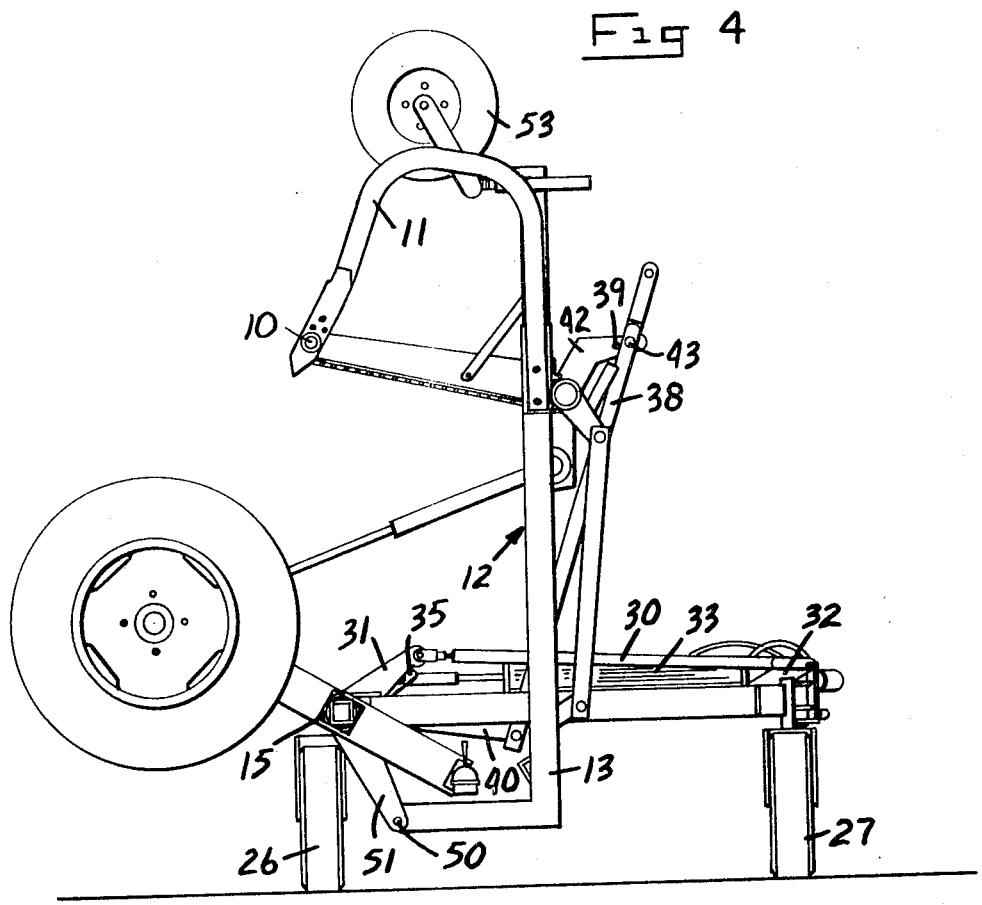
FIG. 4 is a view similar to FIG. 3 showing the apparatus in transport condition.

In order to permit transport of the apparatus in a direction along the shaft 15 for travel from one field to another, it is necessary that the rod weeder frames and apparatus supported thereby be swung to a vertical or upright condition as shown in FIG. 4. This is accomplished by longitudinal lifting arms 38. A single arm 38 is used in conjunction with each of the rod weeder frames 12. Each arm 38 is pivotally connected at its forward end to a crank arm 40 fixed to and rotatable with shaft 15. At its rear end, each arm 38 is bifurcated to form a center upright slot 41 within which is received an extension 42 that projects upwardly from the rod weeder frame 12 and which is fixed thereto. The rear end of each lift arm 38 slides along outwardly projecting transverse pins 39 at each side of the extension 42, which normally is free to move along the lift arm 38 during field operation.

Figure 3:
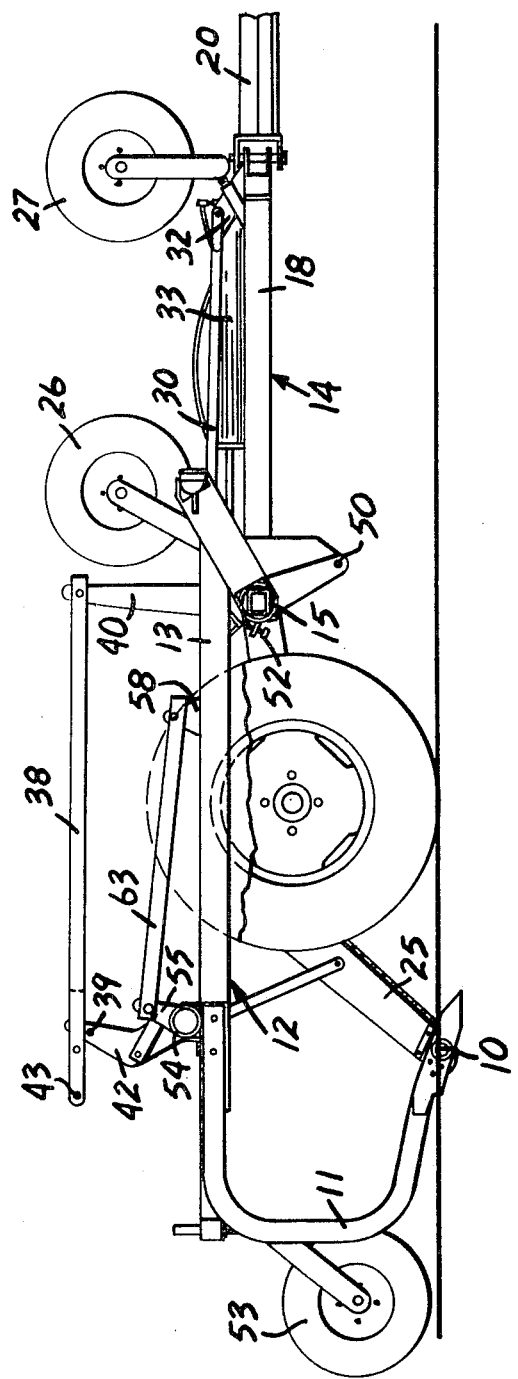
FIG. 3 is an enlarged side view of the apparatus as seen from the left in FIG. 1 with a portion of the first driving wheel broken away.

When it is desired to lift the rod weeder units from the condition shown in FIG. 3 to that shown in FIG. 4, a removable pin 43 is inserted through a forward aperture 44 on the lifting arm 38 and a similar aperture formed through extension 42. This forms a rigid connection including the segment of shaft 15, the rod weeder frame 12 and the lifting arm 38. THe rod weeder frame 12 will then pivot in unison with shaft 15. During field use of the rod weeder, in 43 is conveniently stored in a rear aperture 44 formed through the lifting arm 38, where it does not interfere with the free "floating" condition of rod 10 (See FIG. 3).

Fixed to one end of shaft 15 is a suitable vehicle hitch, provided with a longitudinal offset for proper weight distribution of the structure with respect to a vehicle towing it in a direction perpendicular to its normal direction of travel in the field. The upright condition of each of the rod weeder frames 12 when in transport condition is insured by swinging them over center with respect to their respective pivots 50. Each of the longitudinal members 13 is provided with outward projections 48 which freely rest on upper surfaces of similar projections 47 fixed to the respective adjacent longitudinal members 17.

Figure 2:
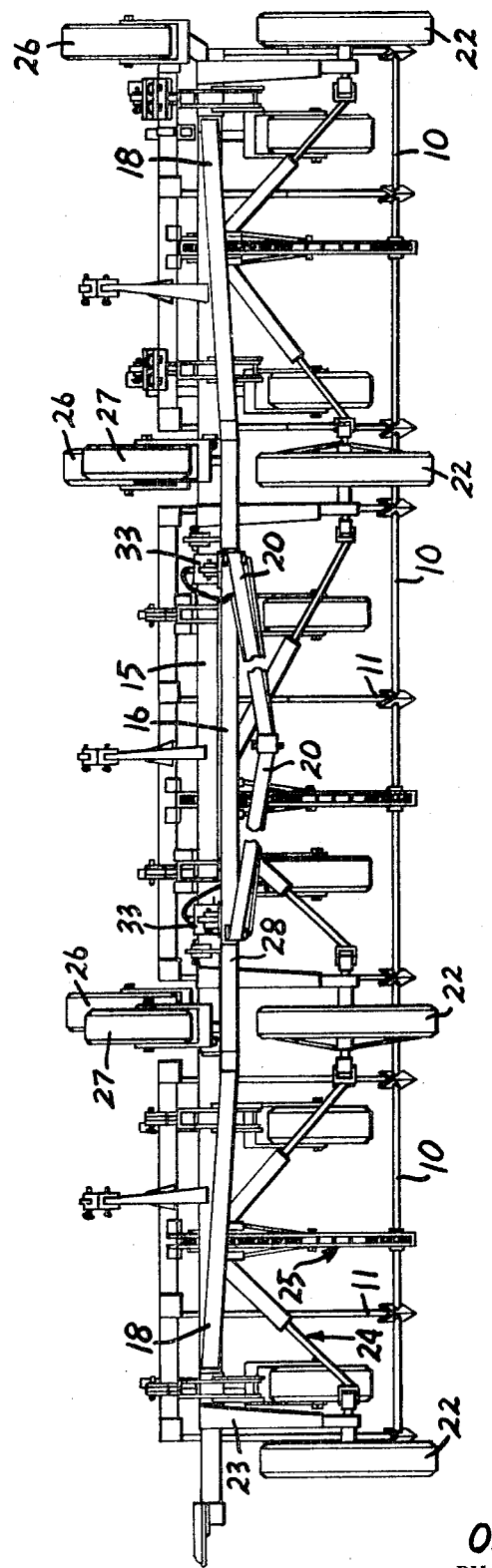
FIG. 2 is a front view of the apparatus shown in FIG. 1.

The operation of the rod weeder configuration is keyed directly to the angular condition of the various segments of shaft 15 as controlled by cylinders 33. When the structure is in field condition as shown in FIGS. 1, 2 and 3, the rod weeder frames 12 are free of any rigid connection to the towing framework 14. Each is free to "float" in response to the foces which cooperate to normally maintain the rod 10 at a desired subsurface elevation.

Referring to FIG. 12, the pressure exerted downwardly on the rod 10 is due to the weight of the rod weeder frame 12 and the configuration of the rod supporting components and further relates to the line of draft A which is drawn through the center of the rod 10 and the transverse pivotal axis of frame 12. It should be noted that the pivot 50 for the rod frame 12 should be as low as practical. Pressure on rod 10 can be varied by varying the elevation of pivots 50 relative to the ground. This is accomplished by adjustment of the cylinders 33 to pivot shaft 15 to thereby raise or lower framework 14, which is elevationally supported at its rear end by the driving wheels 22. Since less than the full travel of the elongated cylinders 33 is required for such pressure adjustment during field operation, the limit bars 37 are employed on the piston rods of the cylinders 33 during such field operating conditions. The cylinders 33 are operated by conventional controls on the towing vehicle (not shown) enabling the user of the implement to selectively vary the pressure exerted on the rod 10 without interrupting travel of the implement through the field.

When it is desired to change the configuration of the apparatus from that required for field operation to that shown in FIG. 4 for transport purposes, cylinder assemblies 33 are fully extended to raise the rod 10 out of its subsoil position and pins 43 are used to directly connect each of the lifting arms 38 to the rod weeder frame extension 42 associated therewith. Limit bars 37 are then swing free of the piston rods of cylinders 33. Cylinders 33 are then fully retracted, imparting pivotal movement to shaft 15 through the respective cranks arms 35. This pivotal movement in a clockwise direction as seen in FIG. 4 swings each of the rod weeder frames 12 about its pivots 50 on the framework 14 unit its falls overcenter and results in the projections 48 coming to rest on the projections 47 as previously described.

During such pivotal movement, the driving wheels 22 are swung about the segments of shaft 15 from a ground engaging position (FIG. 3) to a raised position (FIG. 4). Because of the telescoping nature of the drive connections 24, it is not necessary to disconnect the driving wheels 22 from the drive boots 25. As the drive wheels 22 are lifted from the ground, transport wheels 26 and 27 are lowered into ground contact, being moved from the dashed line positions shown in FIGS. 5 and 6 to the full line positions shown therein. This is accomplished through pivotal movement of the segments of shaft 15 and of the collars 28 in the manner previously described. After folding of the forward extensions 20, the apparatus will be in the condition shown in FIG. 4 and is prepared for highway transport along its length. When the structure is again to be used for field operation, the steps are reversed, lowering the drive wheels 26 and rod weeder frames 12 and raising the transport wheels 26 and 27.

The above description relates to the essential characteristics shown in the drawings. In addition to these, there is illustrated the optional use of trailing wheels 53 for depth control purposes. The wheels 53 are fixed to the rod weeder frame 12 and serve as an optional means to limit downward movement of the rods 12 during field operations. They are not necessary to operation of the unit and should not be used when a constant downward pressure for soil compacting purposes is desired rather than uniform working of the soil at a fixed depth.

Also shown as an optional feature is a release mechanism to permit the gooseneck supports 11 to pivot upwardly about a transverse axis on each rod weeder frame 12 in response to impact forces caused by obstructions such as rocks etc. This option is illustrated in FIG. 1 only on the right hand rod weeder unit. It involves the use of a rotatable shaft 54 at the rear of the rod weeder frame 12, the individual goosenecks 11 being fixed to the pivotable shafts 54. A crank arm 55 extends upwardly and is fixed to shaft 54. It supports the rear ends of rods 56 which are encircled by compression springs 57. The front ends of springs 57 abut a bracket 58 fixed to the respective longitudinal members 13 of the rod weeder frame 12. In addition, a hydraulic cushioning device 60 is connected between the rear end of the gooseneck support 11 and an arm 61 fixed to the longitudinal member 13. A releasable adjustment collar and locking nut is provided at the front end of each rod 56 to permit adjustment of spring compression as required to resist upward movement of the weeder rod 10.

The compression springs 57 permit upward yielding of the gooseneck supports 11 about the axis of shaft 54 when an obstruction such as shown at 62 in FIG. 8 is encountered. As soon as the obstruction has been cleared, the weight of the apparatus will tend to return the gooseneck supports 11 to their original extended position relative to the rod weeder frame 12. This return might be dampened or slowed by the hydraulic cushioning device 60. As shown in FIG. 7, where this feature is not desired, a rigid link 63 is provided between a bracket 58 on the longitudinal members 13 and a similar crank 55 on the shaft 54, thereby making a rigid linkage including the rod weeder frame 12 and the gooseneck supports 11 supported thereby.

SECOND EMBODIMENT

Figure 9:
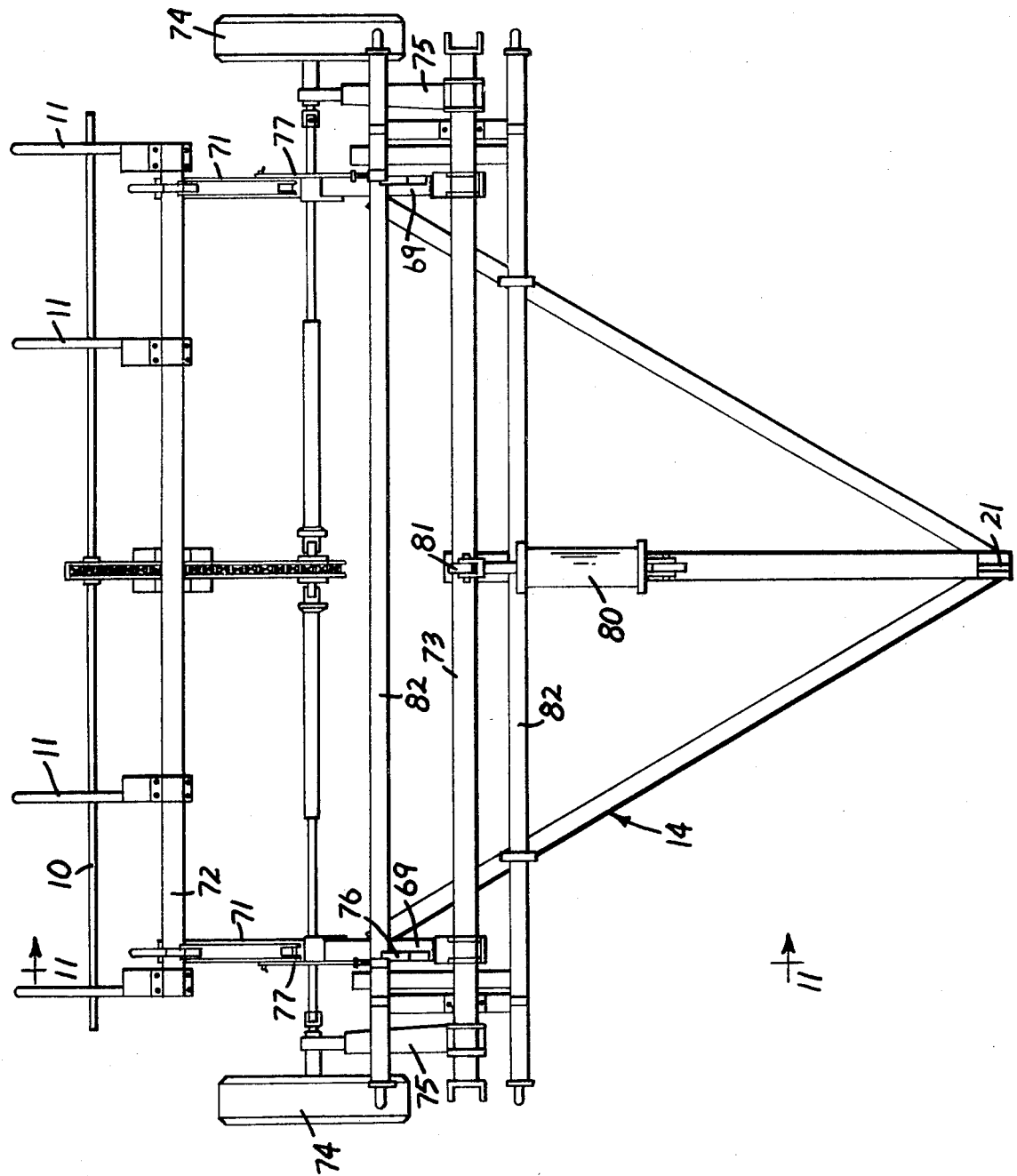
FIG. 9 is a top view of a single unit showing a second embodiment of the invention.
Figure 10:
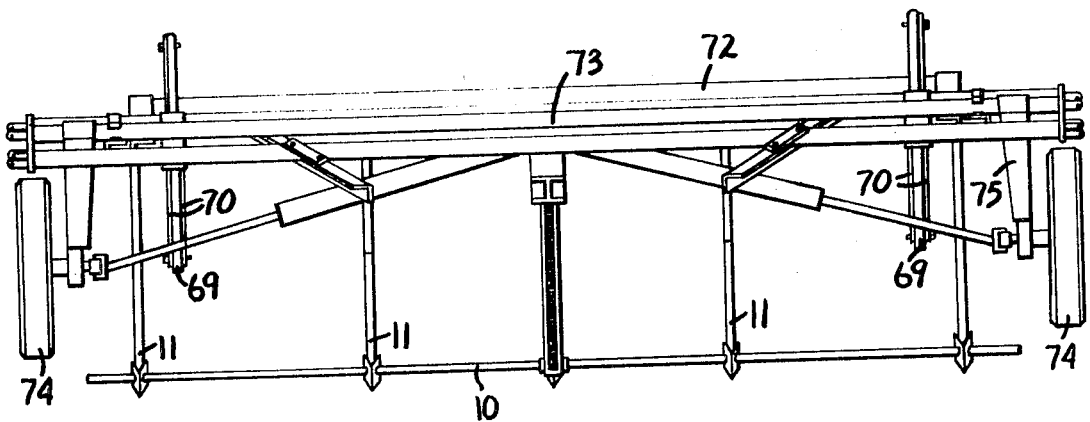
FIG. 10 is a front view of the apparatus shown in FIG. 9.
Figure 11:
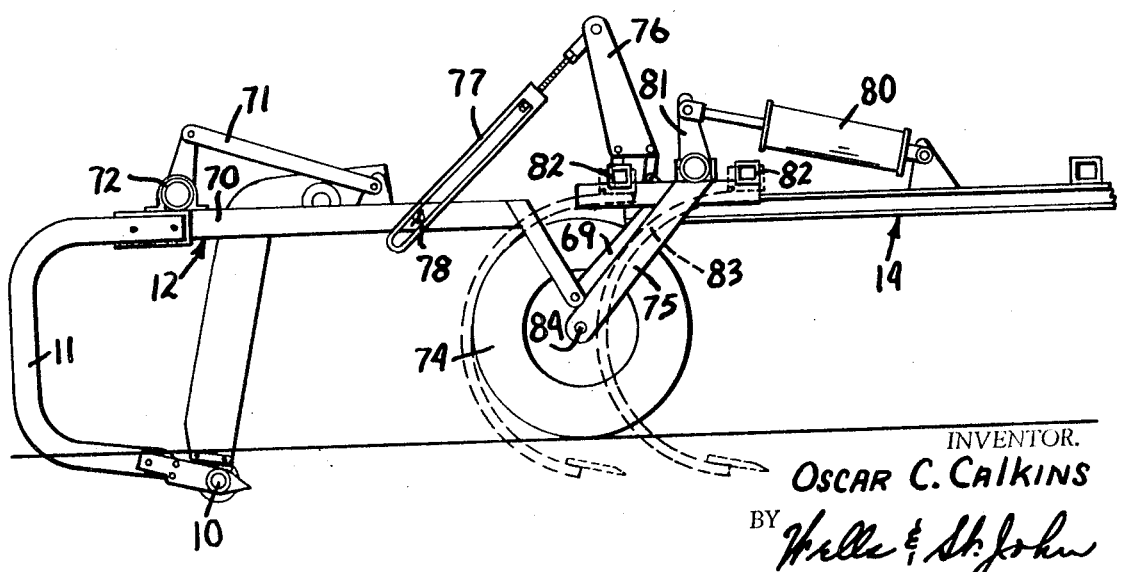
FIG. 11 is a sectional view taken along line 11—11 in FIG. 9.

A second form of the basic invention is shown in FIGS. 9 through 11 and is illustrated schematically at FIG. 13. While only one rod weeder unit is shown for purposes of illustration, obviously multiple units can be arranged side by side in the manner described above.

In this arrangement, the rod 10 is shown supported by transversely spaced gooseneck supports 11 and a drive boot 25 on a rod weeder frame 12 in the general fashion discussed above. The rod weeder frames 12 includes longitudinal members 70 which form part of the rigid frame 12. The gooseneck supports 11 are shown mounted to the rod weeder frame 12 in a fixed condition including a rigid link 71, there being provided a transverse shaft 72 capable of accommodating a yieldable mount for the gooseneck supports 11 as discussed with respect to the disclosure of FIGS. 7 and 8.

The towing framework 14 is a rigid framework including a transverse shaft segment 73. Shaft 73 is rotatably mounted on framework 14 about a transverse axis along its center. Framework 14 is adapted to be selectively supported at its forward end by a hitch 21 which is pivotally connected about a transverse axis on a towing vehicle (not shown).

The elevation of the rear portion of framework 14 is governed by the position of driving wheels 74. The wheels 74 are carried by rigid supports 75 fixed along the segment of shaft 73 in identical angular positions. Also spaced along shaft 73 and fixed thereto are depending crank arms 69. The forward end of each longitudinal member 70 is pivotally connected to one of the crank arms 69 about axes which are transversely aligned on the apparatus, but not necessarily coaxial with the center of the wheels 74.

A lost motion connection is provided between framework 14 in this embodiment and the rod weeder frame 12. This includes an upright extension 76 fixed to the rear of framework 14 and an adjustable slide 77 pivoted at its upper end to extension 76 and freely receiving a pin 78 mounted to the side of one of the longitudinal members 70. A plurality of similar units are provided across the apparatus, all being set identically to selectively limit downward movement of rod weeder frame 12 when necessary due to soft soil conditions. By lowering the wheels 74 and thereby raising framework 14, the lower ends of the slides 77 will lift the rod weeder frame 12 and bring the weeder rod 10 out of soil contact for transport purposes.

The angular position of shaft 73 relative to the towing framework 14 is controlled by a hydraulic cylinder 80 which is anchored at its forward end to framework 14 and which has its piston rod pivotally connected to the upper end of a crank arm 81 fixed to shaft 73.

Also shown extending across the framework 14 in this embodiment are two tool bars 82. The tool bars 82 are capable of carrying spring cultivating teeth such as shown at 83 in FIG. 11, which can be located in staggered transverse positions to assist in breaking up the soil prior to passage of the rod 10.

The weeder rod 10 described in relation to the second embodiment also "floats" in the subsoil condition during normal field operation. Because the line of draft from the pivotal axis of the rod weeder frame 12 to the rod 10 is not substantially changed by adjustment of the wheels 74, the pressure maintaining rod 10 in its working subsoil condition is essentially constant. In this embodiment, it is possible to raise and lower the spring teeth 83 without substantially altering the operating condition of the floating weeder rod 10. This permits one to selectively utilize the additional ground penetration available by use of the combination including the spring teeth 83, or to selectively use the rotating weeder rod 10 alone as desired. The slide 77 serves to limit downward movement of the rod weeder frame 12. It also serves to lift the rod weeder frame 12 so as to move the rod 10 out of the soil upon extreme rotation of shaft 73 in a counterclockwise direction as seen in FIG. 11. In the particular structure shown, the transport condition of the apparatus requires lifting of the rod from the ground so as to clear the ground surface. Side rod weeder units in a three unit system can then be swung upwardly to upright positions for transport in the manner generally shown in prior U.S. Pat. No. 3,003,789 to Oscar C. Calkins or by use of other equivalent mechanisms.

OTHER ALTERNATE EMBODIMENTS

Referring now to FIGS. 12, 13 and 14, the essential features of the present invention are illustrated schematically. These involve the basic concept of a "floating" rod weeder unit capable of being mounted in side by side relation with other similar "floating" rod weeder units operated from a common towing framework and capable of being set for the field conditions encountered. In addition, each of the "floating" rod weeder units is capable of automatic adjustment in elevation as dictated by the particular soil encountered thereby. The three arrangements shown in FIGS. 12, 13 and 14 do not in themselves exhaust the possibilities of structural modification within the scope of this disclosure, but are set out as three practical examples from which others might logically flow.

To recap, in FIG. 12 the towing framework 14 is pivoted to a field vehicle at hitch 21 about a transverse horizontal axis. This axis will remain at approximately the same level above the ground, since the pivot will be at a fixed location on the towing vehicle. In this first embodiment, the wheel supports 23 are pivoted with respect to the towing framework 14 about the central axis of transverse shaft 15. The rod weeder frame 12 is pivoted to the towing framework 14. By raising or lowering driving wheels 22, the rear end of the framework 14 can be raised or lowered, thereby varying the inclination of the line of draft A which is drawn through the pivotal axis of the rod weeder frame 12 and the rotational axis of the rod 10. This in turn varies the pressure on rod 10, urging it to a subsoil operating elevation.

In the second embodiment shown in FIG. 13, the framework 14 and the wheel supports 75 and the shaft 73 are essentially similar to those just discussed with respect to FIG. 12. The pivotal axis of the rod weeder frame 12 remains essentially constant in elevation. Angular adjustment of wheel supports 75 serves to raise the towing framework 14 without substantially varying the line of draft A.

In FIG. 14 is shown another alternative, again utilizing the basic towing framework 14, hitch 21 and rod weeder frame 12. In this instance, the rod weeder frame 12 is pivoted about a transverse axis at 85 located on a member 86 which is vertically adjustable relative to the framework 14. Suitable manual or power operated means can be provided between framework 14 and member 86 to effect such vertical adjustment. In this instance, the wheel supports 87 are shown as being fixed to the framework 14. Again, by vertical adjustment of member 86, one can selectively vary the inclination of the line of draft A and thereby vary the pressure urging rod 10 below the soil surface B.

Various combinations of the apparatus shown in FIGS. 12–14 can be used, providing elevational variation of the rod weeder frame pivot axis, the ground engaging supports for the towing framework, or both. The movement of the axis relative to the framework can be effected independently of the movement of the ground engaging member or in conjunction therewith. The particular physical structure can obviously be varied considerably from the arrangement disclosed herein.

It is to be understood that the various devices disclosed for transporting the rod weeder units can be modified and substituted in differing combinations depending upon the desired type of transport configuration. The first embodiment can be utilized, particularly in smaller applications, with a folding arrangement to bring the sides of the unit upwardly so as to be towed with the wheels 22 in the center section as the supporting transport wheels. Similarly, the general type of floating rod weeder support shown in the second embodiment could be used with an auxiliary transport wheel assembly such as illustrated with respect to the first embodiment. Other types of transport arrangements can also be substituted.

Having thus described my invention, I claim:

1. A rod weeder agricultural implement, comprising:
   a rigid towing framework supported on ground engaging wheels;
   said towing framework having a vertically rigid vehicle hitch extending forward therefrom for pivotal connection to a towing vehicle;
   a rod weeder frame pivotally mounted on said wheel-supported towing framework about a pivot axis that is transverse to the intended forward direction of travel of the towing vehicle and located on said framework at an elevation above the soil surface, said weeder frame extending rearward for said pivot axis and having:
   a plurality of gooseneck rod supports extending rearward and downward from the transverse pivot axis terminating at support ends that extend into the soil below the surface during field operation;
   a weeder rod rotatably mounted on the support ends of the gooseneck rod supports for rotational movement about a transverse rod rotational axis located rearward of said pivot axis during forward movement of the rod through the soil below the surface during field operation; said weeder frame being freely pivotable relative to said towing framework about the pivot axis in a limited arc to enable the weeder rod to freely float up and down in the subsoil unaffected by up and down movement of the vehicle hitch;
   in which a line from the rod rotational axis through the pivot axis in the intended forward direction of travel defines an upwardly and forwardly inclined line of draft of the weeder rod having an angle to the horizontal sufficient to enable the weeder rod to maintain a balanced subsoil elevation during field operation.

2. An apparatus as set out in claim 1 further comprising:
   line of draft adjustment means on said towing framework for selectively varying the elevation of the transverse pivot axis connecting said rod weeder frame and the towing framework relative to the elevation of the weeder rod to thereby change the inclination of the line of draft without impairing free pivotal movement of the rod weeder frame about said pivot axis on said towing framework during field operation.

3. An apparatus as set out in claim 2 further comprising:
   means operatively mounted to said rod weeder frame and to said towing framework to limit the angular amount of downward free pivotal movement of the rod weeder frame relative to the towing framework as the axis of said rod weeder frame is moved upwardly by operation of said draft adjustment means.

4. An apparatus as set out in claim 2 wherein said draft adjustment means comprises:
   a transverse shaft rotatably mounted to said towing framework for rotation about its central shaft axis;
   a plurality of identical wheel supports having the respective ground-engaging wheels mounted thereof each of said wheel supports being fixed to said thereto, in transversely spaced locations along the shaft axis and in identical angular positions relative thereto;
   and means operatively connected between the towing framework and said shaft operable to selectively pivot said shaft about the shaft axis.

5. An apparatus as set out in claim 1 further comprising: means on said framework for selectively varying the elevation of the rigid towing framework relative to the soil without impairing free pivotal movement of the rod weeder frame about said pivot axis on said towing framework during field operation.

6. An apparatus as set out in claim 1 further comprising:
   wheel supports mounted to said towing framework and carrying said ground-engaging wheels for normal ground engagement during field operation;
   and means operatively connected between the towing framework and the wheel supports for adjusting the elevation of the towing framework relative to the wheel supports and wheels whereby the towing framework is pivoted about said vehicle hitch during field operation.

7. An apparatus as set out in claim 1 further comprising:
   a second rod weeder frame having a plurality of rod supports mounted thereto and rotatably journaling a weeder rod;
   said second rod weeder frame being pivotally mounted to said wheel-supported towing framework about a pivot axis transverse to the intended direction of travel of the towing framework, said weeder frame extending rearward from said pivot axis;
   said second rod weeder frame being positioned transversely adjacent to the first-mentioned rod weeder frame and having:
   a plurality of rod supports extending rearward and downward from the transverse pivot axis terminating at support ends that extend into the soil below the surface during field operation; and
   a weeder rod rotatably mounted on the support ends for rotational movement about a transverse rotational axis during forward movement of the rod through the soil below the surface during field operation;
   in which a line through the pivot axis and the rod rotational axis in the intended direction of travel defines an inclined line of draft of the weeder rod; and
   in which the weeder frame is freely pivotable about the pivot axis in a limited arc in relation to the wheel-supported towing framework to enable the weeder rod to freely float up and down in the subsoil unaffected by up and down movement of the vehicle hitch to seek its own level during field operation as determined by the pressure resultant at the rod due to the inclination of the line of draft and the condition of the soil;
   the pivotal movement of said second rod weeder frame being independent of pivotal movement of the first-mentioned rod weeder frame.

8. An apparatus as set out in claim 1 further comprising:
   a plurality of additional rod weeder frames having rod supports mounted thereto and rotatably journaling independent weeder rods;
   said additional rod weeder frames each being pivotally mounted to said wheel-supported towing framework about pivot axes transverse to the intended direction of travel of the towing framework, said weeder frames extending rearward from their respective pivot axes;
   said additional rod weeder frames being located in transverse side by side positions relative to the first-mentioned rod weeder frame and to one another, and each having:
   a plurality of rod supports extending downward and rearward from the transverse pivot axis terminating at support ends that extend into the soil below the surface during field operation; and
   a weeder rod rotatably mounted on the support ends for rotational movement about a transverse rotational axis during forward movement of the rod through the soil below the surface during field operation;
   in which a line through the pivot axis and the rod rotational axis in the intended direction of travel defines an inclined line of draft of the weeder rod; and
   in which the weeder frame is freely pivotable about the pivot axis in a limited arc in relation to the wheel-supported towing framework to enable the weeder rod to freely float up and down in the subsoil unaffected by up and down movement of the vehicle hitch to seek its own level during field operation as determined by the pressure resultant at the rod due to the inclination of the line of draft and the condition of the soil;

the pivotal movement of any individual rod weeder frame being independent of pivotal movement of any other of said rod weeder frames.

9. An apparatus as set out in claim 1 wherein the towing framework is carried by coaxial transversely-spaced ground engaging wheels each having an integrally connected rotating axle;

means operatively connected between the axle of at least one of said wheels and said rod for imparting rotation to said rod responsive to wheel rotation;

the transverse axis between the rod weeder frame and towing framework being displaced from the wheel axis.

10. In a rod weeder:
a towing framework comprising a plurality of transversely aligned sections hinged to one another so as to permit angular movement between adjacent sections about parallel longitudinal axes therebetween;

ground-engaging wheels mounted to and supporting said towing framework;

a vehicle hitch mounted to the forward end of said towing framework in the intended forward direction of field travel, said hitch being adapted to be pivotally connected to a towing vehicle;

a plurality of rod weeder frames corresponding in number to the number of sections of said framework;

said rod weeder frames being pivotally mounted to said towing framework sections about pivot axes that are transverse to the intended forward direction of travel of the towing vehicle and located on said framework at an elevation above the soil surface, said rod weeder frames extending rearward from their respective pivot axes, and each of said rod weeder frames having:

a plurality of gooseneck rod supports extending rearward and downward from the transverse pivot axis terminating at support ends that extend into the soil below the surface during field operation; and a weeder rod rotatably mounted on the support ends of the gooseneck rod supports for rotational movement about a transverse rod rotational axis located rearward of said pivot axis during forward movement of the rod through the soil below the surface during field operation;

said weeder frame being freely pivotable relative to said towing framework about the pivot axis in a limited arc to enable the weeder rod to freely float up and down in the subsoil unaffected by up and dow movement of the vehicle hitch;

in which a line from the rod rotational axis through the pivot axis in the intended forward direction of travel defines an upwardly and forwardly inclined line of draft of the weeder rod having an angle to the horizontal sufficient to enable the weeder rod to maintain a balanced subsoil elevation during field operation;

the pivotal movement of each rod weeder frame being independent of similar pivotal movement of the remaining rod weeder frames.

11. An apparatus as set out in claim 10 further comprising:
a shaft assembly mounted to said towing framework and including a plurality of segments equal in number to the number of framework sections, the segments of said shaft assembly being aligned in end to end relation in a direction across said framework transverse to movement of the framework during field operation, each of said segments having a transverse central axis along the respective lengths thereof;

the transversely adjacent ends of the respective segments of said shaft assembly being hinged to one another by universal joints;

bearing means on the framework supporting the segments of said shaft assembly for rotational movement of each segment thereof about its central axis;

a plurality of identical wheel supports having said ground-engaging wheels mounted thereto, each of said wheel supports being fixed along the respective segments of said shaft assembly in transversely spaced locations in identical angular positions relative to the central axes thereof;

and means operatively connected between the towing framework and said shaft assembly for selectively positioning the segments of said shaft assembly about the central axis thereof.

12. An apparatus as set out in claim 11 wherein said ground-engaging wheels are operatively connected to the weeder rods so as to rotate said rods in response to rotation of said wheels;

the transverse axes between the rod weeder frames and towing framework sections being displaced from the wheel axes on each respective framework section.

13. An apparatus as set out in claim 11 further comprising:
a plurality of identical crank arms fixed to the segments of said shaft assembly in identical angular positions relative to the central axes thereof, the number and spacing of said crank arms along said shaft assembly corresponding to the number of rod weeder frames;

the respective pivotal mounting of each rod weeder frame to said framework being effected by identical pivotal connections between each rod weeder frame and said arms about transverse axes radially spaced outward of the respective central axes of the shaft segments of said shaft assembly.

* * * * *